(12) United States Patent
Nishimura et al.

(10) Patent No.: US 10,109,258 B2
(45) Date of Patent: Oct. 23, 2018

(54) DEVICE AND METHOD FOR PRESENTING INFORMATION ACCORDING TO A DETERMINED RECOGNITION DEGREE

(71) Applicant: MITSUBISHI ELECTRIC CORPORATION, Tokyo (JP)

(72) Inventors: Hiroshi Nishimura, Tokyo (JP); Yoshitomo Nakamura, Tokyo (JP); Atsushi Shimada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 14/766,862

(22) PCT Filed: Jul. 18, 2013

(86) PCT No.: PCT/JP2013/069520
§ 371 (c)(1),
(2) Date: Aug. 10, 2015

(87) PCT Pub. No.: WO2015/008363
PCT Pub. Date: Jan. 22, 2015

(65) Prior Publication Data
US 2016/0012801 A1    Jan. 14, 2016

(51) Int. Cl.
*G09G 5/37* (2006.01)
*G01C 21/36* (2006.01)
(Continued)

(52) U.S. Cl.
CPC ............ *G09G 5/37* (2013.01); *G01C 21/365* (2013.01); *G02B 27/01* (2013.01); *G06F 3/013* (2013.01);
(Continued)

(58) Field of Classification Search
CPC ............ G02B 27/01; G02B 2027/014; G02B 2027/0187; G06F 3/013; G01C 21/365; G09G 2320/08; G09G 2340/14; G09G 2380/10; G09G 5/30; G09G 5/37
See application file for complete search history.

(56) References Cited

U.S. PATENT DOCUMENTS

| 5,422,653 A * | 6/1995 | Maguire, Jr. ...... G02B 27/2228 345/9 |
| 2002/0044152 A1* | 4/2002 | Abbott, III .............. G06T 11/00 345/629 |

(Continued)

FOREIGN PATENT DOCUMENTS

| JP | 2006-072876 | 3/2006 |
| JP | 2006-184222 A | 7/2006 |

(Continued)

*Primary Examiner* — Michelle L Sams
(74) *Attorney, Agent, or Firm* — Birch, Stewart, Kolasch & Birch, LLP

(57) ABSTRACT

There are provided an attention-time measuring unit that specifies an attention area from a user's visual line and measures an attention time T that is a time period during which the attention area is overlapping with a display area indicated by presentation information acquired by a presentation-information acquiring unit; a minimum recognition-necessary-time specifying unit that specifies, from a type of a presentation object indicated in the presentation information, a minimum recognition-necessary time $T_{min}$ that is a minimum necessary time for recognizing the content of the presentation object; and a user's recognition-degree determination unit that makes a comparison between the time T and the time $T_{min}$, and determines from that comparison result, a recognition degree of the user for the presentation object; wherein a presentation-mode selecting unit presents the presentation object in a presentation mode corresponding to the recognition degree determined by the determination unit.

6 Claims, 6 Drawing Sheets

| Type of Display Object \ Recognition Degree | Level 1 | Level 2 | Level 3 |
|---|---|---|---|
| Icon | Audio Guidance + Blinking Display | Blinking Display | No Highlighting |
| Character | Audio Guidance + Blinking Display | Blinking Display | No Highlighting |
| Map | Pop-Up Window (Blinking) | Pop-Up Window (No Blinking) | Delete Pop-Up Window |

(51) Int. Cl.
*G02B 27/01* (2006.01)
*G06F 3/01* (2006.01)
*G06K 9/00* (2006.01)
*G09G 5/30* (2006.01)

(52) U.S. Cl.
CPC ........... *G06K 9/00604* (2013.01); *G09G 5/30* (2013.01); *G02B 2027/014* (2013.01); *G02B 2027/0187* (2013.01); *G09G 2320/08* (2013.01); *G09G 2340/14* (2013.01); *G09G 2380/10* (2013.01)

(56) References Cited

U.S. PATENT DOCUMENTS

| | | | | |
|---|---|---|---|---|
| 2009/0125849 | A1* | 5/2009 | Bouvin | G06F 3/013 715/863 |
| 2009/0184887 | A1 | 7/2009 | Mizuno et al. | |
| 2012/0236172 | A1* | 9/2012 | Ellenby | G06K 9/00671 348/222.1 |
| 2013/0136304 | A1* | 5/2013 | Anabuki | G06K 9/00362 382/103 |
| 2014/0002352 | A1* | 1/2014 | Jacob | G06F 3/013 345/156 |
| 2014/0204014 | A1* | 7/2014 | Thorn | G06F 3/011 345/156 |
| 2015/0012403 | A1* | 1/2015 | Buck | G06F 3/013 705/37 |

FOREIGN PATENT DOCUMENTS

| | | |
|---|---|---|
| JP | 2008-013070 | 1/2008 |
| JP | 2009-169253 A | 7/2009 |
| JP | 2009-229385 A | 10/2009 |
| JP | 2010-039645 | 2/2010 |
| JP | 2010-039646 A | 2/2010 |
| JP | 2012-245880 A | 12/2012 |

* cited by examiner

| Type of Display Object | Minimum Recognition -Necessary Time | Supplement |
|---|---|---|
| Icon | 1.5 seconds | 60 years or over: Add 1.0 second to Minimum Recognition-Necessary Time |
| Character | Character Number × 0.8 second | |
| Map | Vary Depending on Amount of Information | |
| Video | Video Time + 1.5 second | |

FIG.5

| Type of Display Object \ Recognition Degree | Level 1 | Level 2 | Level 3 |
|---|---|---|---|
| Icon | Audio Guidance + Blinking Display | Blinking Display | No Highlighting |
| Character | Audio Guidance + Blinking Display | Blinking Display | No Highlighting |
| Map | Pop-Up Window (Blinking) | Pop-Up Window (No Blinking) | Delete Pop-Up Window |

FIG.7

| Importance Degree / Recognition Degree | Importance Degree 1 Gasoline Residual Amount 30% or less | Importance Degree 2 Gasoline Residual Amount 20% or less | Importance Degree 3 Gasoline Residual Amount 10% or less |
|---|---|---|---|
| Level 1 | Icon Blinking | Icon Blinking Message Display | Audio Guidance Icon Blinking Message Display |
| Level 2 | Suspend Blinking | Suspend Blinking | Suspend Audio Guidance Suspend Blinking |
| Level 3 | No Highlighting | Delete Message | Change Message to Simple Message |

DEVICE AND METHOD FOR PRESENTING INFORMATION ACCORDING TO A DETERMINED RECOGNITION DEGREE

TECHNICAL FIELD

This invention relates to an information presentation device and an information presentation method for displaying a presentation object (for example, an icon, a character, a map, a video, etc.), for example, on a display of a car-navigation device, or the like.

BACKGROUND ART

In an information presentation device disclosed in Patent Document 1 shown below, a visual line of a vehicle driver is detected, so that an attention object on which the driver is paying an attention, is specified and information corresponding to the type of the attention object is displayed.

This makes it possible to properly provide information that the driver requires.

In an information presentation device disclosed in Patent Document 2 shown below, there is provided means for detecting, as a user's state, motion of the visual line of the user, so that, for example, a state where the visual line of the user is directed to the outside of the screen, a state where the waveform of his/her twinkling becomes a moderate form, and a state where eyeball components rapidly decrease, are detected.

This information presentation device, when detected the above-described state, judges to be at the time it is allowed to display information on a screen, to thereby determine a display position of the information on the basis of a relationship between a state of windows arranged on the screen and a point of attention of the user, and displays that information.

This makes it possible to reduce a risk of overlooking without interfering with the user's concentration on his/her operation.

CITATION LIST

Patent Document

Patent Document 1: Japanese Patent Application Laid-open No.2008-13070 (Paragraph Number [0007])
Patent Document 2: Japanese Patent Application Laid-open No.2006-72876 (Paragraph Numbers [0016] and [0020])

SUMMARY OF THE INVENTION

Problems to be Solved by the Invention

Since the conventional information presentation devices are configured as described above, in the case of Patent Document 1, although it is possible to properly provide the information that the driver requires, it is unable to adjust an amount of the information upon understanding of the recognition degree of the user for a presentation object. Thus, because of too much information, there is a problem of causing overlooking of information or troublesomeness thereon in some cases.

Further, in the case of Patent Document 2, although it is possible to judge when information is to be presented, from the motion of the visual line of the user, it is unable, like Patent Document 1, to adjust an amount of the information upon understanding of the recognition degree of the user for a presentation object. Thus, because of too much information, there is a problem of causing overlooking of information or troublesomeness thereon in some cases.

This invention has been made to solve the problems as described above, and an object thereof is to provide an information presentation device and an information presentation method capable of suppressing too much information presentations to thereby reduce troublesomeness due to presentation of information.

Means for Solving the Problems

An information presentation device according to the invention is that in which a recognition-degree determination processor is provided that makes a comparison between an attention time during which a user is paying an attention on a presentation object and a recognition necessary time having been determined depending on a content of the presentation object, and determines from a result of that comparison, a recognition degree of the user for the presentation object, so that a presentation processor presents the presentation object in a presentation mode corresponding to the recognition degree determined by the recognition-degree determination processor.

Effect of the Invention

According to the invention, the recognition-degree determination processor is provided that makes a comparison between an attention time during which a user is paying an attention on a presentation object and a recognition necessary time having been determined depending on a content of the presentation object, and determines from a result of that comparison, a recognition degree of the user for the presentation object, and the presentation processor is configured to present the presentation object in a presentation mode corresponding to the recognition degree determined by the recognition-degree determination processor. Thus, there is produced an effect that it is possible to suppress too much information presentations to thereby reduce troublesomeness due to presentation of information.

BRIEF DESCRIPTION OF THE DRAWINGS

FIG. 5 is an illustration diagram showing an example of presentation modes each corresponding to a recognition degree of a user.

FIG. 7 is an illustration diagram showing an example of presentation modes each corresponding to a recognition degree of the user and an importance degree of a presentation object.

MODES FOR CARRYING OUT THE INVENTION

Hereinafter, for illustrating the invention in more detail, embodiments for carrying out the invention will be described in accordance with the accompanying drawings.

Embodiment 1

Figure 1:
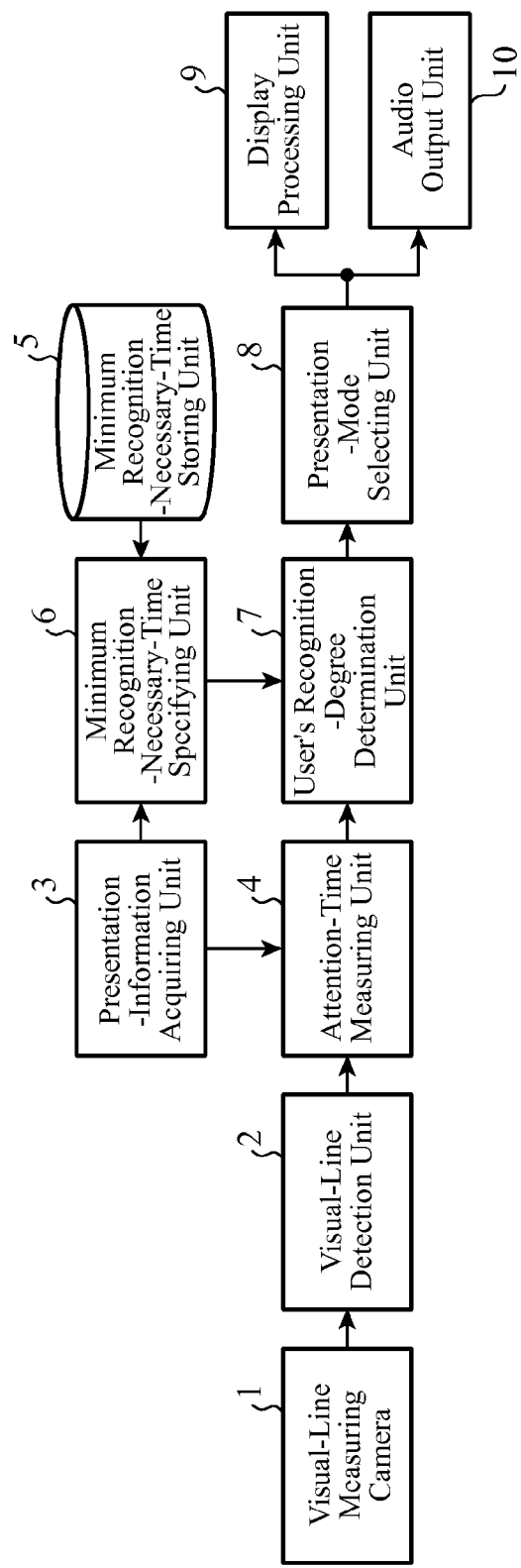
FIG. 1 is a configuration diagram showing an information presentation device according to Embodiment 1 of the invention.

FIG. 1 is a configuration diagram showing an information presentation device according to Embodiment 1 of the invention.

In FIG. 1, a visual-line measuring camera 1 is configured, for example, with an imaging device, such as a CCD camera or the like, and performs processing of: capturing an image to be used in detection of the visual line of a user (visual-line detection image); and outputting image data of the visual-line detection image. The visual-line detection image is an image in which a face of the user is captured.

A visual-line detection unit 2 is configured, for example, with a semiconductor integrated circuit with a CPU mounted thereon, a single chip microcomputer or the like, and performs processing of analyzing the image data outputted from the visual-line measuring camera 1 to thereby detect the visual line of the user.

A presentation-information acquiring unit 3 is configured, for example, with a semiconductor integrated circuit with a CPU mounted thereon, a single chip microcomputer or the like, and performs processing of acquiring from an application, presentation information indicative of, for example, a type, a display area (display position), a size, a color, a timing, an expression mode of animation, an importance degree and the like, with respect to a presentation object (for example, an icon, a character, a map, a video, etc.) currently displayed by a display processing unit 9 or the presentation object that will be displayed on the display processing unit 9.

An attention-time measuring unit 4 is configured, for example, with a semiconductor integrated circuit with a CPU mounted thereon, a single chip microcomputer or the like, and performs processing of: specifying from the visual line detected by the visual-line detection unit 2, an attention area that is an area that the user is looking at; and measuring an attention time T that is a time period during which the attention area is overlapping with a display area indicated by the presentation information acquired by the presentation-information acquiring unit 3.

A minimum recognition-necessary-time storing unit 5 is configured with a storage device, such as, for example, a RAM or a hard disk, and is storing therein a table in which a correspondence relationship is shown between a type of a presentation object and a minimum recognition-necessary time (minimum necessary time for recognizing the content of the presentation object).

A minimum recognition-necessary-time specifying unit 6 is configured, for example, with a semiconductor integrated circuit with a CPU mounted thereon, a single chip microcomputer or the like, and performs processing of referring to the table stored by the minimum recognition-necessary-time storing unit 5 to thereby specify a minimum recognition-necessary time $T_{min}$ corresponding to the type of the presentation object indicated by the presentation information acquired by the presentation-information acquiring unit 3.

A user's recognition-degree determination unit 7 is configured, for example, with a semiconductor integrated circuit with a CPU mounted thereon, a single chip microcomputer or the like, and performs processing of: making a comparison between the attention time T measured by the attention-time measuring unit 4 with the minimum recognition-necessary time $T_{min}$ specified by the minimum recognition-necessary-time specifying unit 6; and determining from the result of that comparison, a recognition degree of the user for the presentation object. Note that the user's recognition-degree determination unit 7 constitutes a recognition-degree recognition processor.

A presentation-mode selecting unit 8 is configured, for example, with a GPU (Graphics Processing Unit), a single chip microcomputer or the like, and performs processing of: displaying on the display processing unit 9, the presentation object in a presentation mode corresponding to the recognition degree determined by the user's recognition-degree determination unit 7; and outputting audio data indicative of the content of the presentation object to an audio output unit 10.

The display processing unit 9 is configured, for example, with an LCD display or the like, and displays the presentation object on a screen under control of the presentation-mode selecting unit 8.

The audio output unit 10 is configured, for example, with a speaker or the like, and outputs a sound/voice according to the audio data outputted from the presentation-mode selecting unit 8.

Note that a presentation processor is constituted by the presentation-mode selecting unit 8, the display processing unit 9 and the audio output unit 10.

In FIG. 1, it is assumed that the visual-line measuring camera 1, the visual-line detection unit 2, the presentation-information acquiring unit 3, the attention-time measuring unit 4, the minimum recognition-necessary-time storing unit 5, the minimum recognition-necessary-time specifying unit 6, the user's recognition-degree determination unit 7, the presentation-mode selecting unit 8, the display processing unit 9 and the audio output unit 10, that are configuration elements of the information presentation device, are configured by their respective dedicated hardware; however, all of or a part of the information presentation device may be configured by a computer.

For example, in the case of the information presentation device a part of which (the visual-line detection unit 2, the presentation-information acquiring unit 3, the attention-time measuring unit 4, the minimum recognition-necessary-time storing unit 5, the minimum recognition-necessary-time specifying unit 6, the user's recognition-degree determination unit 7 and the presentation-mode selecting unit 8) is configured by a computer, it suffices to establish the minimum recognition-necessary-time storing unit 5 on an internal memory or an external memory of the computer; to store in the memory of the computer, programs in which written are processing details of the visual-line detection unit 2, the presentation-information acquiring unit 3, the attention-time measuring unit 4, the minimum recognition-necessary-time specifying unit 6, the user's recognition-degree determination unit 7 and the presentation-mode selecting unit 8; and to cause a CPU of the computer to execute the programs stored in the memory.

Figure 2:
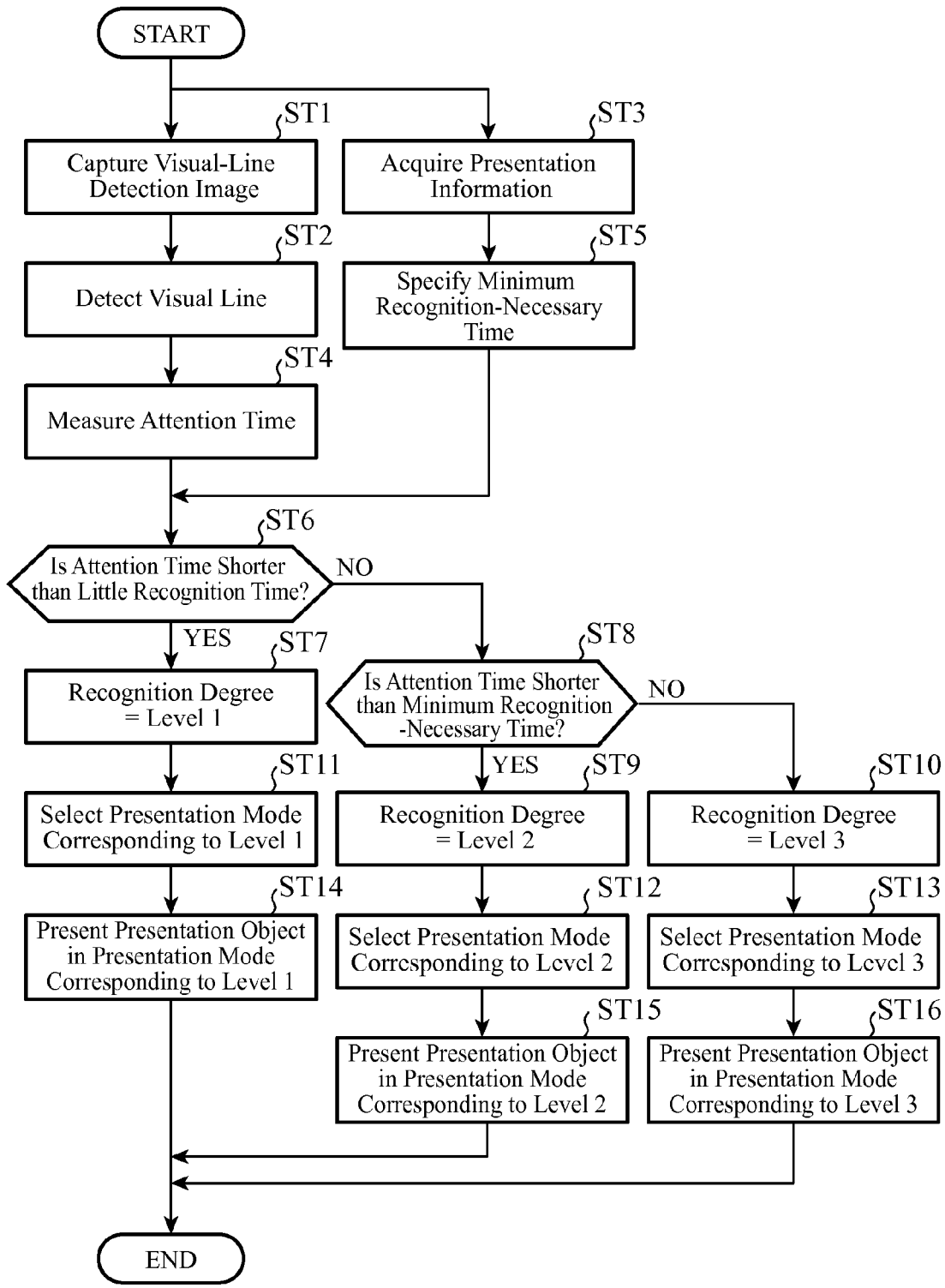
FIG. 2 is a flowchart showing processing details (information presentation method) of the information presentation device according to Embodiment 1 of the invention.

FIG. 2 is a flowchart showing processing details (information presentation method) of the information presentation device according to Embodiment 1 of the invention.

Next, operations will be described.

In Embodiment 1, it is assumed that the information presentation device is installed in a vehicle, and a HUD (Head-Up Display), a display of a car-navigation device and an instrumental panel each have a function of the display processing unit 9.

Figures 3, 4:
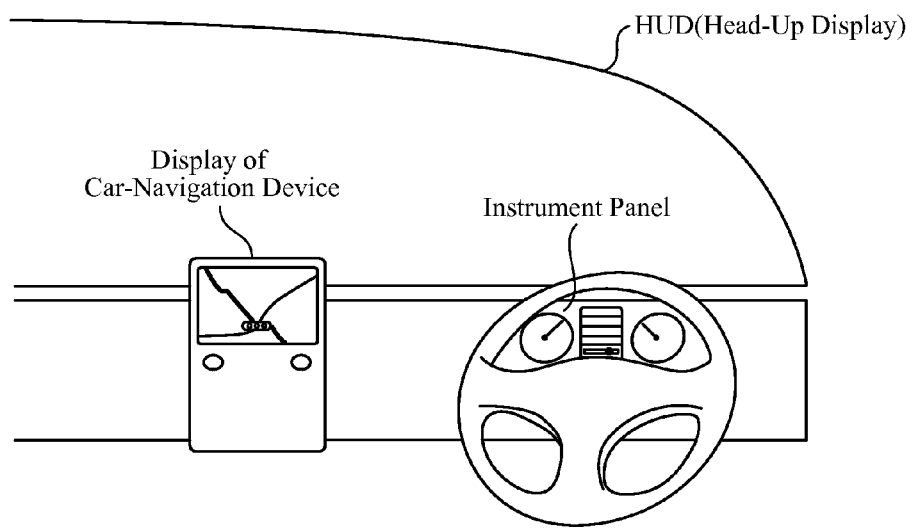
FIG. 3 is an illustration diagram showing an HUD, a display of a car-navigation device and an instrument panel, in a vehicle.
FIG. 4 is an illustration diagram showing a table stored by a minimum recognition-necessary-time storing unit 5.

FIG. 3 is an illustration diagram showing the HUD, the display of the car-navigation device and the instrument panel, in the vehicle.

The visual-line measuring camera 1 captures the visual-line detection image that is an image to be used in detection of the visual line of the user, and outputs the image data of the visual-line detection image to the visual-line detection unit 2 (Step ST1 in FIG. 2). Note that capturing of the visual-line detection image is performed repetitively in a continuous or intermittent manner.

The visual-line detection unit 2, at every time it receives the image data of the visual-line detection image from the visual-line measuring camera 1, analyzes that image data to thereby detect the visual line of the user (Step ST2).

The processing of analyzing the image data to detect the visual line of the user is itself a publicly known technique, so that its detailed description is omitted here.

Note that, as the detection result of the visual line of the user, for example, a two-dimensional coordinate (an XY coordinate in a plane on which the HUD, the display of the car-navigation device and the instrument panel are arranged) of a point that the user is looking at (a point of attention), or a three-dimensional coordinate (an XYZ coordinate in a space in which the HUD, the display of the car-navigation device and the instrument panel are arranged) of a point that the user is looking at (a point of attention), is outputted to the attention-time measuring unit 4 in a time-series manner.

The presentation-information acquiring unit 3 acquires from an application, the presentation information indicative of, for example, a type, a display area (display position), a size, a color, a timing, an expression mode of animation, an importance degree and the like, with respect to the presentation object currently displayed by the display processing unit 9 or the presentation object that will be displayed on the display processing unit 9, and outputs the presentation information to the attention-time measuring unit 4 and the minimum recognition-necessary-time specifying unit 6 (Step ST3).

The attention-time measuring unit 4 specifies from the detection result of the visual line by the visual-line detection unit 2, the attention area that is an area that the user is looking at.

Here, the "attention area" means an area (except for a stable visual field) within an effective visual field centering on a point that the user is looking at (a point of attention).

The attention-time measuring unit 4, when specified the attention area of the user, measures the attention time T that is a time period during which the attention area is overlapping with the display area indicated by the presentation information acquired by the presentation-information acquiring unit 3 (Step ST4).

For example, when the display area indicated by the presentation information acquired by the presentation-information acquiring unit 3, is the display of the car-navigation device, a time period during which the attention area of the user is covering the display of the car-navigation device, is measured as the attention time T.

Upon receiving the presentation information from the presentation-information acquiring unit 3, the minimum recognition-necessary-time specifying unit 6 refers to the table stored by minimum recognition-necessary-time storing unit 5, to thereby specify the minimum recognition-necessary time $T_{min}$ corresponding to the type of the presentation object indicated by the presentation information (Step ST5).

In this respect, FIG. 4 is an illustration diagram showing the table stored by the minimum recognition-necessary-time storing unit 5.

The minimum recognition-necessary time $T_{min}$ is a minimum necessary time for recognizing the content of the presentation object. In FIG. 4, there are shown examples including those in which if the type of the presentation object is icon, the minimum recognition-necessary time $T_{min}$ is given as 1.5 seconds, and if the type of the presentation object is character, the minimum recognition-necessary time $T_{min}$ is given as (a number of characters)×0.8 seconds.

Note that the minimum recognition-necessary time $T_{min}$ may be changed depending on an attribute of the user (for example, a state of visual line, a tiredness, an age, an ability to understand, etc.).

For example, in the case where the user is an elderly person aged 60 or over, such an embodiment is conceivable in which 1.0 second is added to the above minimum recognition-necessary time $T_{min}$.

When the attention-time measuring unit 4 measured the attention time T and the minimum recognition-necessary-time specifying unit 6 specified the minimum recognition-necessary time $T_{min}$, the user's recognition-degree determination unit 7 makes a comparison between the attention time T and the minimum recognition-necessary time $T_{min}$ and determines the recognition degree of the user for the presentation object from the result of that comparison.

In the followings, processing of determining the recognition degree of the user by the user's recognition-degree determination unit 7 will be described specifically.

Here, such a time is defined as a "little recognition time $T_{Little}$" that is assumed not to allow the content of the presentation object to be recognized sufficiently, but to allow it to be somewhat recognized.

Note that, as the little recognition time $T_{Little}$, 0.75 second or the like that is shorter than the minimum recognition-necessary time $T_{min}$ is conceivable.

When the attention-time measuring unit 4 measured the attention time T, the user's recognition-degree determination unit 7 compares the attention time T with the little recognition time $T_{Little}$ (Step ST6). If the attention time T is shorter than the little recognition time $T_{Little}$, because the recognition degree of the user for the presentation object is thought to be extremely low, the user's recognition-degree determination unit 7 identifies the recognition degree of the user as "Level 1" (Step ST7).

If the attention time T is more than or equal to the little recognition time $T_{Little}$, the user's recognition-degree determination unit 7 compares the attention time T with the minimum recognition-necessary time $T_{min}$ (Step ST8).

If the attention time T is shorter than the minimum recognition-necessary time $T_{min}$, because the content of the presentation object is thought to have not been recognized sufficiently, but have been somewhat recognized, the user's recognition-degree determination unit 7 identifies the recognition degree of the user as "Level 2" (Step ST9).

Further, if the attention time T is more than or equal to the minimum recognition-necessary time $T_{min}$, because the content of the presentation object is thought to have been recognized sufficiently, the user's recognition-degree determination unit 7 identifies the recognition degree of the user as "Level 3" (Step ST10).

When the user's recognition-degree determination unit 7 determined the recognition degree of the user for the presentation object, the presentation-mode selecting unit 8 selects from among a plurality of presentation modes, a presentation mode corresponding to the recognition degree of the user.

Namely, the presentation-mode selecting unit 8 serves to select the presentation mode that is more unnoticeable as the recognition degree of the user determined by the recognition-degree determination processor 7 becomes higher, and if the recognition degree of the user is Level 1 that is lowest, selects a most noticeable presentation mode (Step ST11), if the recognition degree of the user is Level 2 that is a middle one, selects a somewhat noticeable presentation mode (Step ST12), and if the recognition degree of the user is Level 3 that is highest, selects an unnoticeable presentation mode (Step ST13).

In this respect, FIG. 5 is an illustration diagram showing an example of the presentation modes each corresponding to a recognition degree of the user.

In FIG. 5, there is shown an example in which, when the type of the presentation object is icon and if the recognition degree is Level 1 that is lowest, "Icon Blinking Display Audio Guidance" is selected as the presentation mode.

Further, examples are shown therein in which, if the recognition degree is Level 2 that is a middle one, only "Icon Blinking Display" is selected as the presentation mode, and if the recognition degree is Level 3 that is highest, no highlighting is applied to the icon.

The presentation-mode selecting unit 8, when selected the presentation mode corresponding to the recognition degree of the user, displays the presentation object in the presentation mode on the display processing unit 9 and outputs the audio data indicative of the content of the presentation object to the audio output unit 10.

Namely, the presentation-mode selecting unit 8, if the recognition degree of the user is Level 1 that is lowest, displays the presentation object in the presentation mode corresponding to Level 1 on the display processing unit 9 and outputs the audio data indicative of the content of the presentation object to the audio output unit 10 (Step ST14), and if the recognition degree is Level 2 that is a middle one, displays the presentation object in the presentation mode corresponding to Level 2 on the display processing unit 9 and outputs the audio data indicative of the content of the presentation object to the audio output unit 10 (Step ST15).

Further, if the recognition degree of the user is Level 3 that is highest, the presentation-mode selecting unit displays the presentation object in the presentation mode corresponding to Level 3 on the display processing unit 9 and outputs the audio data indicative of the content of the presentation object to the audio output unit 10 (Step ST16).

In the followings, a specific example at the time the presentation-mode selecting unit 8 presents the presentation object, will be described. It should be noted that the following example is just an example.

For example, in the case where an announcement of the car-navigation device is the presentation object and the announcement is "Deviated from the Route", since the type of this presentation object is character and the number of characters [in Japanese] is 11, the minimum recognition-necessary time $T_{min}$ results in 8.8 seconds (=11×0.8 second) in the manner shown in FIG. 4.

Accordingly, if the attention time T during which the user is looking at the display of the car-navigation device is 8.8 seconds or more, the presentation object is presented in the presentation mode corresponding to Level 3 that is highest in the recognition degree of the user.

In that case in FIG. 5, without subjecting the announcement of "Deviated from the Route" to highlighting such as blinking or the like (in order to prevent troublesomeness from occurring due to presentation of information, no highlighting is applied), the announcement of "Deviated from the Route" is displayed on the display of the car-navigation device that is a display processing unit 9.

Meanwhile, if the attention time T during which the user is looking at the display of the car-navigation device is the little recognition time $T_{Little}$ (0.75 second) or more but less than 8.8 seconds, the presentation object is presented in the presentation mode corresponding to Level 2 that is a middle one in the recognition degree of the user.

In that case in FIG. 5, the announcement of "Deviated from the Route" is displayed in a blinking manner on the display of the car-navigation device that is a display processing unit 9, thus causing the user to become aware that the announcement is displayed.

Meanwhile, if the attention time T during which the user is looking at the display of the car-navigation device is shorter than the little recognition time $T_{Little}$ (0.75 second), the presentation object is presented in the presentation mode corresponding to Level 1 that is lowest in the recognition degree of the user.

In that case in FIG. 5, in order to cause the user to surely become aware that the announcement is displayed, the announcement of "Deviated from the Route" is displayed in a blinking manner on the display of the car-navigation device that is a display processing unit 9, and the announcement of "Deviated from the Route" is outputted by voice from the audio output unit 10.

For example, in the case where an alarm indicative of an abnormality in the vehicle is the presentation object and an icon indicative of the content of the alarm (for example, an icon indicative of an engine abnormality) is to be presented on the instrument panel, since the type of the presentation object is icon, the minimum recognition-necessary time $T_{min}$ results in 1.5 seconds in the manner shown in FIG. 4.

Accordingly, if the attention time T during which the user is looking at the instrument panel is 1.5 seconds or more, the presentation object is presented in the presentation mode corresponding to Level 3 that is highest in the recognition degree of the user.

In that case in FIG. 5, without subjecting the icon to highlighting such as blinking or the like (in order to prevent troublesomeness from occurring due to presentation of information, no highlighting is applied), the icon is displayed on the instrument panel that is a display processing unit 9.

Meanwhile, if the attention time T during which the user is looking at the instrument panel is the little recognition time $T_{Little}$ (0.75 second) or more but less than 1.5 seconds, the presentation object is presented in the presentation mode corresponding to Level 2 that is a middle one in the recognition degree of the user.

In that case in FIG. 5, the icon is displayed in a blinking manner on the instrument panel that is a display processing unit 9, thus causing the user to become aware that the icon is displayed.

Meanwhile, if the attention time T during which the user is looking at the instrument panel is shorter than the little recognition time $T_{Little}$ (0.75 second), the presentation object is presented in the presentation mode corresponding to Level 1 that is lowest in the recognition degree of the user.

In that case in FIG. 5, in order to cause the user to surely become aware that the icon is displayed, the icon is displayed in a blinking manner on the instrument panel that is a display processing unit 9, and a content meant by the icon (for example, an engine abnormality) is outputted by voice from the audio output unit 10.

Here, such cases are shown where a recognition degree of the user is determined for a single presentation object and the presentation object is displayed on the display of the car-navigation device or the instrument panel according to the recognition degree of the user for that presentation object; however, recognition degrees of the user for a plurality of presentation objects may be determined at the same time to thereby display the respective presentation objects each on a given display processing unit 9 according to the recognition degrees of the user for the respective presentation objects.

As is clear from the above, according to Embodiment 1, it is configured to provide: the attention-time measuring unit 4 that specifies, from a visual line detected by the visual-line detection unit 2, the attention area that is an area that the user is looking at, and measures the attention time T that is a time period during which the attention area is overlapping with the display area indicated by the presentation information acquired by the presentation-information acquiring unit 3; the minimum recognition-necessary-time specifying unit 6 that specifies, from the type of the presentation object indicated by the presentation information acquired by the presentation-information acquiring unit 3, the minimum recognition-necessary time $T_{min}$ that is a minimum necessary time for recognizing the content of the presentation object; and the user's recognition-degree determination unit 7 that makes a comparison between the attention time T measured by the attention-time measuring unit 4 and the minimum recognition-necessary time $T_{min}$ specified by the minimum recognition-necessary-time specifying unit 6, and determines from the result of that comparison, the recognition degree of the user for the presentation object; wherein the presentation-mode selecting unit 8 presents the presentation object in the presentation mode corresponding to the recognition degree determined by the user's recognition-degree determination unit 7. Thus, there is produced an effect that it is possible to suppress too much information presentations to thereby reduce troublesomeness due to presentation of information.

Accordingly, for example, in a case of deviation from the route presented by the car-navigation device, if in the past, such problems arise that troublesomeness occurs due to continuing sounding of the audio guidance of "Deviated from the Route" during deviation from the route; troublesomeness occurs due to a re-routing alternative that remains on and is not disappearing from the screen of the car-navigation device; the area for map information becomes smaller due to the re-routing alternative that remains on and is not disappearing from the screen; and likewise. However, according to Embodiment 1, when the recognition degree of the user becomes high, for example by stopping the audio guidance or moving/suspending the re-routing alternative, it is possible to suppress too much information presentations to thereby reduce troublesomeness due to presentation of information.

In Embodiment 1, description has been made about a case where the information presentation device is installed in a vehicle, and the HUD, the display of the car-navigation device and the instrumental panel each have a function of the display processing unit 9; however, it is allowable that, for example, a display of a monitoring control system, a display at the driver's seat of a train, a display in a cockpit of a plane, a monitor placed at the operation seat of a ship, or a digital signage associated with a touch operation and placed in a public space, has a function of the display processing unit 9, so that the presentation-mode selecting unit 8 displays the presentation object on such a display or the like.

Further, in Embodiment 1, description has been made about a case where: the minimum recognition-necessary-time storing unit 5 stores therein the table in which a correspondence relationship is shown between the type of the presentation object and the minimum recognition-necessary time (minimum necessary time for recognizing the content of the presentation object); the minimum recognition-necessary-time specifying unit 6 performs processing of referring to the table stored by the minimum recognition-necessary-time storing unit 5 to thereby specify the minimum recognition-necessary time $T_{min}$; and the user's recognition-degree determination unit 7 performs processing of making a comparison between the attention time T measured by the attention-time measuring unit 4 and the minimum recognition-necessary time $T_{min}$ specified by the minimum recognition-necessary-time specifying unit 6, and determining from the result of that comparison, the recognition degree of the user for the presentation object.

However, the user's recognition-degree determination unit 7 may be that which makes a comparison between the attention time T measured by the attention-time measuring unit 4 and a predetermined time (a time for recognition) having been determined depending on the content of the presentation object and determines from the result of that comparison, the recognition degree of the user for the presentation object. Thus, the time for recognition is not limited to the minimum recognition-necessary time $T_{min}$. For example, it may be an average time for recognizing the content of the presentation object, a maximum time among the times taken by plural persons as samples to recognize the content of the presentation object, or the like.

In this case, the minimum recognition-necessary-time storing unit 5 is configured to store therein a table in which a correspondence relationship is shown between the type of the presentation object and the time for recognition, and the minimum recognition-necessary-time specifying unit 6 is configured to perform processing of referring to the table stored by the minimum recognition-necessary-time storing unit 5 to thereby specify the time for recognition.

Instead, an attention time measured by an external device may be referred to, and the functions of the display processing unit 9 and the audio output unit 10 may be made up with external devices. In that case, the visual-line measuring camera 1, the visual-line detection unit 2, the attention-time measuring unit 4, the display processing unit 9 and the audio output unit 10, in FIG. 1, may be unnecessary.

Further, in a case where, as shown in Embodiment 1, the presentation object does not present plural pieces of information but presents a single piece of information, it is not necessary to refer to the table of the minimum recognition-necessary time. In that case, the presentation-information acquiring unit 3, the minimum recognition-necessary-time storing unit 5 and the minimum recognition-necessary-time specifying unit 6, in FIG. 1, may be unnecessary.

Embodiment 2

Figure 6:
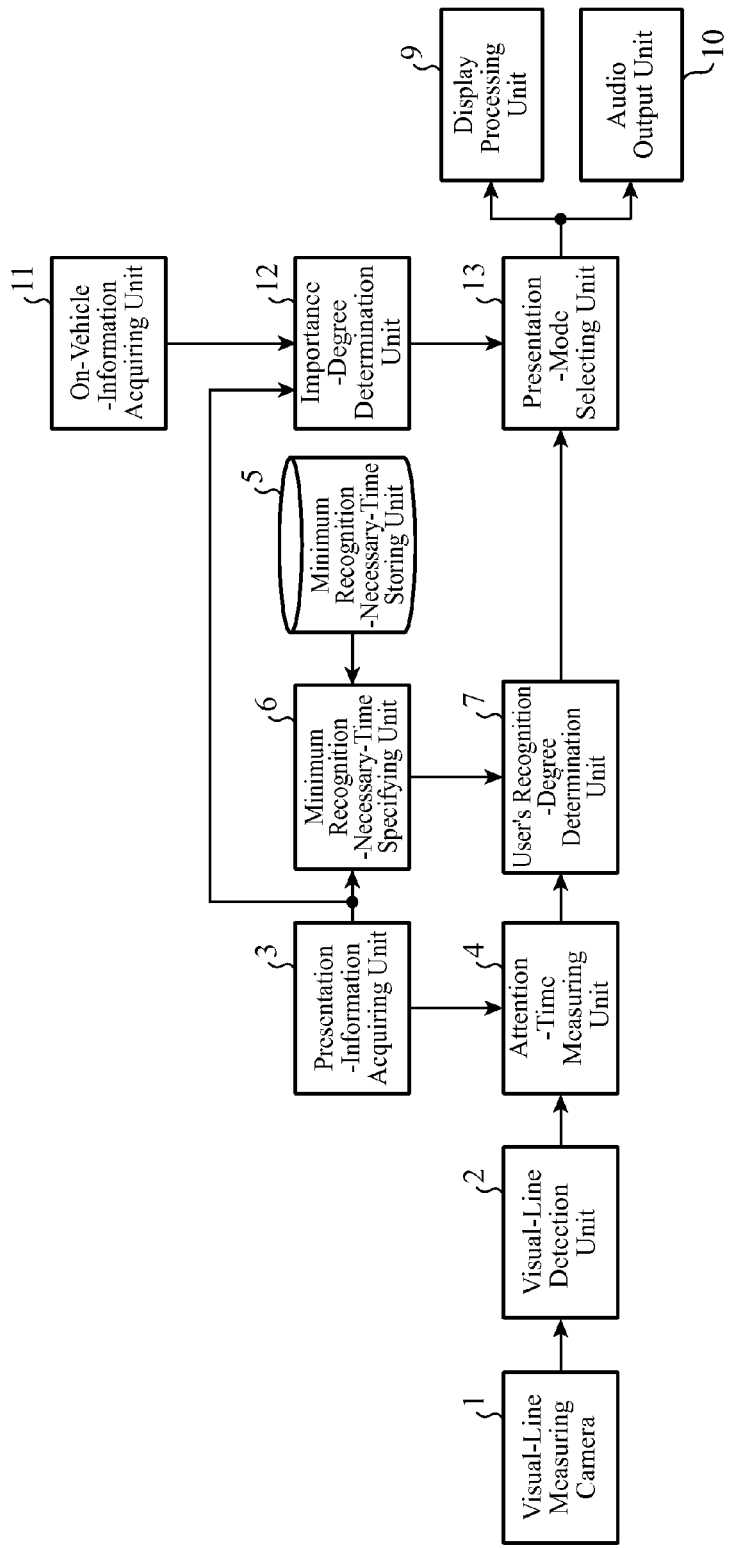
FIG. 6 is a configuration diagram showing an information presentation device according to Embodiment 2 of the invention.

FIG. 6 is a configuration diagram showing an information presentation device according to Embodiment 2 of the invention, in which the same reference numerals as those in FIG. 1 indicate the same or equivalent parts, so that their description is omitted here.

An on-vehicle-information acquiring unit 11 is configured, for example, with a semiconductor integrated circuit with a CPU mounted thereon, a single chip microcomputer or the like, and performs processing of acquiring on-vehicle information indicative of a current vehicle condition or the like (vehicle inside/outside information, such as, for example, a vehicle speed, an acceleration rate, a gasoline residual amount in a gasoline car, an energy residual amount in an electric car, a tire air pressure, positional information about a current place, etc., an ambient temperature, a temperature/humidity in a vehicle, a currently-played-back music, and/or navigation information).

An importance-degree determination unit 12 is configured, for example, with a semiconductor integrated circuit with a CPU mounted thereon, a single chip microcomputer or the like, and performs processing of determining an importance degree of the presentation object on the basis of the on-vehicle information acquired by the on-vehicle-information acquiring unit 11.

Note that an importance-degree determination processor is constituted by the on-vehicle-information acquiring unit 11 and the importance-degree determination unit 12.

A presentation-mode selecting unit 13 is configured, for example, with a GPU, a single chip microcomputer or the like, and performs processing of: displaying on the display processing unit 9, the presentation object in a presentation mode corresponding to the recognition degree determined by the user's recognition-degree determination unit 7 and the importance degree determined by the importance-degree determination unit 12; and outputting audio data indicative of the content of the presentation object to the audio output unit 10. Note that the presentation-mode selecting unit 13 constitutes a presentation processor.

In FIG. 6, it is assumed that the visual-line measuring camera 1, the visual-line detection unit 2, the presentation-information acquiring unit 3, the attention-time measuring unit 4, the minimum recognition-necessary-time storing unit 5, the minimum recognition-necessary-time specifying unit 6, the user's recognition-degree determination unit 7, the on-vehicle-information acquiring unit 11, the importance-degree determination unit 12, the presentation-mode selecting unit 13, the display processing unit 9 and the audio output unit 10, that are configuration elements of the information presentation device, are configured by their respective dedicated hardware; however, all of or a part of the information presentation device may be configured by a computer.

For example, in the case of the information presentation device a part of which (the visual-line detection unit 2, the presentation-information acquiring unit 3, the attention-time measuring unit 4, the minimum recognition-necessary-time storing unit 5, the minimum recognition-necessary-time specifying unit 6, the user's recognition-degree determination unit 7, the on-vehicle-information acquiring unit 11, the importance-degree determination unit 12 and the presentation-mode selecting unit 13) is configured by a computer, it suffices to establish the minimum recognition-necessary-time storing unit 5 on an internal memory or an external memory of the computer; to store in the memory of the computer, programs in which written are processing details of the visual-line detection unit 2, the presentation-information acquiring unit 3, the attention-time measuring unit 4, the minimum recognition-necessary-time specifying unit 6, the user's recognition-degree determination unit 7, the on-vehicle-information acquiring unit 11, the importance-degree determination unit 12 and the presentation-mode selecting unit 13; and to cause a CPU of the computer to execute the programs stored in the memory.

In Embodiment 1, such a case is shown where the presentation-mode selecting unit 8 displays the presentation object on the display processing unit 9 in the presentation mode corresponding to the recognition degree determined by the user's recognition-degree determination unit 7, and outputs the audio data indicative of the content of the presentation object to the audio output unit 10; however, it is allowable that the presentation-mode selecting unit 13 displays the presentation object on the display processing unit 9 in the presentation mode corresponding to the recognition degree determined by the user's recognition-degree determination unit 7 and the importance degree determined by the importance-degree determination unit 12, and outputs the audio data indicative of the content of the presentation object to the audio output unit 10.

A specific description thereof is as follows.

Since other elements than the on-vehicle-information acquiring unit 11, the importance-degree determination unit 12 and the presentation-mode selecting unit 13, are similar to those in Embodiment 1, only the processing details of the on-vehicle-information acquiring unit 11, the importance-degree determination unit 12 and the presentation-mode selecting unit 13 will be described here.

The on-vehicle-information acquiring unit 11 acquires on-vehicle information indicative of a current vehicle condition or the like, and outputs the on-vehicle information to the importance-degree determination unit 12.

As the on-vehicle information, herein acquired is vehicle inside/outside information, such as, for example, a vehicle speed, an acceleration rate, a gasoline residual amount in a gasoline car, an energy residual amount in an electric car, a tire air pressure, positional information about a current place, etc., an ambient temperature, a temperature/humidity in a vehicle, a currently-played-back music, and/or navigation information.

Upon obtaining the presentation information acquired by the presentation-information acquiring unit 3 and upon receiving the on-vehicle information related to the presentation information from the on-vehicle-information acquiring unit 11, the importance-degree determination unit 12 determines the importance degree of the presentation object on the basis of the on-vehicle information.

For example, in the case where an alarm indicative of an abnormality of the vehicle is the presentation object and an icon with an alarm content for a lowering of the gasoline residual amount is to be presented on the instrument panel, the importance degree of the presentation object is determined based on the on-vehicle information related to the gasoline residual amount.

Specifically, with respect to the on-vehicle information related to the gasoline residual amount, when it indicates that the gasoline residual amount is 30% or less, the importance degree of the presentation object is given as Importance Degree 1 (low degree of importance); when it indicates that the gasoline residual amount is 20% or less, the importance degree of the presentation object is given as Importance Degree 2 (medium degree of importance); and when it indicates that the gasoline residual amount is 10% or less, the importance degree of the presentation object is given as Importance Degree 3 (high degree of importance).

When the user's recognition-degree determination unit 7 determined the recognition degree of the user for the presentation object and the importance-degree determination unit 12 determined the importance degree of presentation object, the presentation-mode selecting unit 13 selects from among a plurality of presentation modes, a presentation mode corresponding to the recognition degree of the user and the importance degree of the presentation object.

Namely, the presentation-mode selecting unit 13 selects the presentation mode that is more noticeable as the importance degree becomes higher, while selecting like the presentation-mode selecting unit 8 in FIG. 1, the presentation mode that is more unnoticeable as the recognition degree of the user determined by the recognition-degree determination processor 7 becomes higher.

In this respect, FIG. 7 is an illustration diagram showing an example of presentation modes each corresponding to the recognition degree of the user and the importance degree of the presentation object.

In Embodiment 2, even at the same level in the recognition degree of the user, if the importance degrees of the presentation object are different to each other, different presentation modes are selected for them.

In FIG. 7, for example, in the case where the recognition degree of the user is Level 1, if the gasoline residual amount is 10% or less (Importance Degree 3), urgency is high and thus it is necessary to cause the user to surely recognize the presentation object, so that the icon is displayed in a blinking manner on the instrument panel that is a display processing unit 9 and an message indicating that the gasoline residual amount is 10% or less, is displayed on the HUD, the display of the car-navigation device or the like, that is a display processing unit 9. Further, the massage indicating that the gasoline residual amount is 10% or less is outputted by voice from the audio output unit 10.

Even at the same Level 1 in the recognition degree of the user, in the case where the gasoline residual amount is 20% or less (Importance Degree 2), urgency is not so high as in the case where the gasoline residual amount is 10% or less, so that the icon is displayed in a blinking manner on the instrument panel that is a display processing unit 9 and an message indicating that the gasoline residual amount is 20% or less, is displayed on the HUD, the display of the car-navigation device or the like, that is a display processing unit 9; however, the massage indicating that the gasoline residual amount is 20% or less is not outputted by voice.

Further, even at the same Level 1 in the recognition degree of the user, in the case where the gasoline residual amount is 30% or less (Importance Degree 1), urgency is not high, so that only blinking display of the icon is performed from a viewpoint of suppressing troublesomeness due to too much information.

As is clear from the above, according to Embodiment 2, it is configured to include the importance-degree determination unit 12 that determines the importance degree of the presentation object on the basis of the on-vehicle information acquired by the on-vehicle-information acquiring unit 11, wherein the presentation-mode selecting unit 13 displays the presentation object on the display processing unit 9 in the presentation mode corresponding to the recognition degree determined by the user's recognition-degree determination unit 7 and the importance degree determined by the importance-degree determination unit 12, and outputs the audio data indicative of the content of the presentation object to the audio output unit 10. Thus, like Embodiment 1, there is produced an effect that it is possible to suppress too much information presentations to thereby reduce troublesomeness due to presentation of information, and in addition, to present the presentation object in a proper presentation mode matched to a current situation.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

The information presentation device according to the invention is suited as a device that is highly required to suppress too much information presentations to thereby reduce troublesomeness due to presentation of information, at the time of displaying a presentation object (for example, an icon, a character(s), a map, a video, etc.) on the display of a car-navigation device or the like.

DESCRIPTION OF REFERENCE NUMERALS AND SIGNS

1: visual-line measuring camera, 2: visual-line detection unit, 3: presentation-information acquiring unit, 4: attention-time measuring unit, 5: minimum recognition-necessary-time storing unit, 6: minimum recognition-necessary-time specifying unit, 7: user's recognition-degree determination unit (recognition-degree determination processor), 8: presentation-mode selecting unit (presentation processor), 9: display processing unit (presentation processor), 10: audio output unit(presentation processor), 11: on-vehicle-information acquiring unit (importance-degree determination processor), 12: importance-degree determination unit (importance-degree determination processor), 13: presentation-mode selecting unit (presentation processor).

The invention claimed is:
1. An information presentation device, comprising:
a computer which is configured to receive captured images from a camera, which is configured to capture images of a face of a user; and
a memory operably connected to the computer, said memory storing instructions which, when executed by the computer, performs a process including:
processing the captured images to detect visual lines of the user, and convert the detected visual lines to a corresponding presentation object which presents information to the user and is displayed on a display device proximate to the user, with different types of presentation objects for presenting different types of information to the user being respectively displayed in different areas on the display device;
measuring a time span during which the user pays attention to the corresponding presentation object to determine a respective attention time;
for the presentation object displayed by the display device to which the user is paying attention,
specifying a recognition necessary time corresponding to the type of the presentation object to which the user is paying attention, by referring to a table in which the different types of presentation objects, including the type of the presentation object to which the user is paying attention, are shown with different corresponding recognition necessary times, each of the recognition necessary times being a minimum necessary time for recognizing a content of the corresponding type of presentation object,
comparing the attention time during which the user has paid attention to the presentation object to the specified recognition necessary time, and
determining from a result of the comparison a recognition degree of the user for the presentation object, wherein a higher recognition degree corresponds to a longer attention time; and
redisplaying the information already presented in the presentation object in a different presentation mode corresponding to the determined recognition degree, wherein the presentation mode is designed to make the information already presented in the presentation object more noticeable to the user in case the rec- ognition degree indicates that the corresponding attention time is too short.

2. The information presentation device of claim 1, wherein the presentation mode is presence or absence of a highlighting of the presentation object.

3. The information presentation device of claim 1, wherein the process presents the presentation object in the presentation mode that is more unnoticeable as the recognition degree of the user determined by the recognition-degree determination processor becomes higher.

4. The information presentation device of claim 1, wherein the process further comprises determining an importance degree of the presentation object, and wherein the process presents the presentation object in the presentation mode corresponding to the determined recognition degree and the determined importance degree.

5. The information presentation device of claim 4, wherein the process presents the presentation object in the presentation mode that is more noticeable as the importance degree determined by the importance-degree determination processor becomes higher.

6. An information presentation method, comprising:
   receiving, by a processor, captured images from a camera, which is configured to capture images of a face of a user;
   processing the captured images to detect visual lines of the user and convert the detected visual lines to a corresponding presentation object which presents information to the user and is displayed on a display device proximate to the user, with different types of presentation objects for presenting different types of information to the user being respectively displayed in different areas on the display device;
   measuring time spans during which the user pays attention to the corresponding presentation object to determine a respective attention time;
   for the presentation object displayed by the display device to which the user is paying attention,
      specifying a recognition necessary time corresponding to the type of the presentation object to which the user is paying attention, by referring to a table in which the different types of presentation objects, including the type of the presentation object to which the user is paying attention, are shown with different corresponding recognition necessary times, each of the recognition necessary times being a minimum necessary time for recognizing a content of the corresponding type of presentation object,
      comparing the attention time during which the user has paid attention to the presentation object to the specified recognition necessary time, and
      determining from a result of that comparison, a recognition degree of the user for the presentation object, wherein a higher recognition degree corresponds to a longer attention time; and
   redisplaying the information already presented in the presentation object in a presentation mode corresponding to the determined recognition degree, wherein the presentation mode is designed to make the information already presented in the presentation object more noticeable to the user in case the recognition degree indicates that the corresponding attention time is too short.

* * * * *